United States Patent [19]

Yano et al.

[11] Patent Number: 5,229,151
[45] Date of Patent: Jul. 20, 1993

[54] METHOD FOR MAKING GROUND FISH MEAT PRODUCTS

[75] Inventors: Michihiko Yano, Sagamihara; Masao Takahashi, Musashino; Masayoshi Kazama, Machida; Shigeo Hasegawa, Sagamihara, all of Japan

[73] Assignee: Shin Nippon Giken Ltd., Kanagawa, Japan

[21] Appl. No.: 864,670

[22] Filed: Apr. 7, 1992

[30] Foreign Application Priority Data

Apr. 10, 1991 [JP] Japan .................................. 3-077507

[51] Int. Cl.$^5$ ............................................. A23L 1/325
[52] U.S. Cl. ..................................... 426/256; 426/643
[58] Field of Search ................ 426/253, 256, 643, 413

[56] References Cited

U.S. PATENT DOCUMENTS

| 4,181,749 | 1/1980 | Niki et al. | 426/643 |
| 4,794,007 | 12/1988 | Ozaki | 426/643 X |
| 4,806,378 | 2/1989 | Ueno et al. | 426/643 |
| 5,006,353 | 4/1991 | Nishi et al. | 426/643 X |
| 5,087,466 | 2/1992 | Coudrains et al. | 426/256 |

Primary Examiner—Arthur L. Corbin
Attorney, Agent, or Firm—Merchant, Gould, Smith, Edell, Welter & Schmidt

[57] ABSTRACT

A ground fish meat (surimi) is produced by bleaching raw fish meat with water in the presence of a quality-improving agent comprising calcium chloride, potassium chloride, or a mixture of sodium chloride with potassium chloride or calcium chloride in an amount of 0.01 to 3.0% of the total weight of the raw fish meat and the bleaching water. During the bleaching, the fish meat is forcibly stirred. Then, the thus bleached fish meat is ground to produce a surimi product.

11 Claims, 1 Drawing Sheet

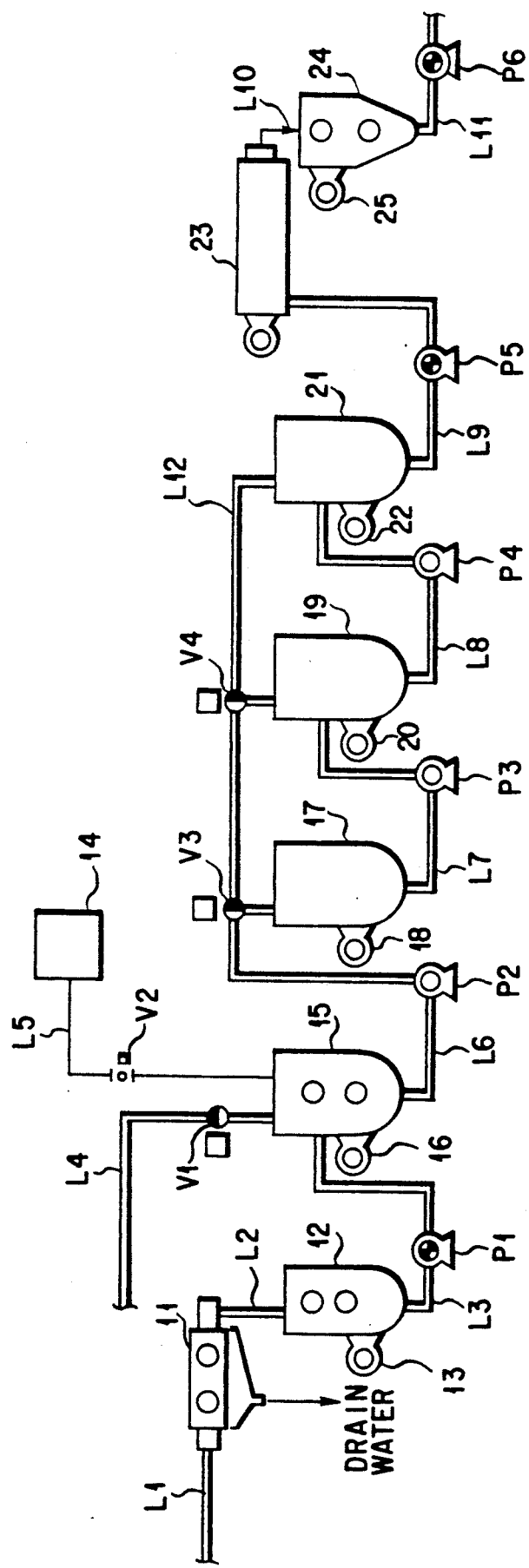
F I G. 1

METHOD FOR MAKING GROUND FISH MEAT PRODUCTS

BACKGROUND OF THE INVENTION

1. Field of the Invention

The present invention relates to a method for making ground fish meat products (SURIMI).

2. Description of the Related Art

In general, the conventional method for making surimi products includes the steps of: taking meat out of a fish body; bleaching the meat with water; dewatering the meat preliminarily; removing fine bones, hard muscles and skins from the meat; dewatering the meat again; and grinding the meat with additives.

Where the fish to be processed by the above conventional method is fresh and contains high-quality meat, the surimi product obtained thereby does not become a problem. However, where the fish is not fresh or does not contain tough meat, just like the fish dwelling in a shallow fishing ground or the fish after spawning, the surimi product obtained can only provide a final fish paste product which is too soft and is very low in quality. Such low-quality surimi products are put on sale as second- or third-class products.

SUMMARY OF THE INVENTION

Accordingly, an object of the present invention is to provide a method for making a ground fish meat (surimi) product, which can produce a surimi having a high-quality even where the fish to be processed is not fresh or does not contain tough meat.

To achieve this object, the present invention provides a method for making a surimi product comprising the steps of: bleaching raw fish meat with water in the presence of a quality-improving agent comprising calcium chlorid, potassium chloride, or a combination of sodium chloride with potassium chloride or calcium chloride in an amount of 0.01 to 3.0% based on the total weight of the raw fish meat plus water, and subjecting the raw fish meat to strong stirring; and making a surimi product from the raw fish meat thus bleached with water.

BRIEF DESCRIPTION OF THE DRAWINGS

FIG. 1 shows the major portion of the apparatus used in the method of the present invention.

DETAILED DESCRIPTION OF THE PREFERRED EMBODIMENTS

The present invention will be described in detail.

The inventors of the preset invention conducted various researches in an effort to obtain high-quality surimi products even when the fish to be processed was not fresh or did not contain tough meat. As a result of the researches, the inventors found that surimi products of remarkably high quality could be obtained by bleaching raw fish meat with water in the presence of calcium chloride, potassium chloride or a combination of sodium chloride with calcium chloride or potassium chloride, and by forcibly stirring the raw fish meat during the bleaching with water. Conventionally, it was believed in the art that the raw fish meat had to be stirred as gently as possible in the water-bleaching treatment of meat, so as not to destroy the tissues of the fish meat. Therefore, it was an unexpected fact that the forcible stirring of raw fish meat during the water bleaching step resulted in high-quality surimi products.

In order to make surimi products according to the method of the present invention, fish meat is taken out of a fish body, washed with water, and then dewatered. These preparatory procedures are taken according to the conventional technique. Subsequently, the dewatered fish meat is bleached with water under the conditions detailed below, dewatered preliminarily, and cleared of fine bones, hard muscles and skins. After the fish meat is dewatered again, additives are added thereto in accordance with the need, and the mixture is ground to provide a surimi. The surimi product can be encased and subjected to heat treatment, to thereby obtain a fish paste product. The fish to be processed includes any marine fish such as a walleye pollack, a croaker, a mackerel, a hake, a southern cod, a horse mackerel, and a sardine. Freshwater fish may also be used.

FIG. 1 shows an apparatus by which the washing-/dewatering step through the preliminary dewatering step are carried out. Fish meat obtained in an ordinary method is supplied through line L1 to a washing/dewatering machine 11, where it is washed with water and dewatered. The dewatered fish meat is supplied through line L2 to a tank 12 having a stirrer 13. From the tank 12, the fish meat is supplied through line L3 to a first bleaching tank 15 in a predetermined amount by means of a rotary type metering pump P1.

When the predetermined amount of fish meat has been supplied into the tank 15, fresh water is supplied into the tank 15 by way of line L4 in response to the operation of valve V1. Simultaneously, a quality-improving agent is supplied into the tank 15 from a storage tank 14 by way of line L5 in response to the operation of valve V2. Normally, the fresh water is added to the fish meat in an amount of 130 to 200 parts by weight per 100 parts by weight of fish meat. The quality-improving agent is preferably a mixture of sodium chloride with potassium chloride or calcium chloride. It is desirable that the sodium chloride accounts for 30 to 80% by weight of the mixture. The amount of quality-improving agent supplied is in the range of 0.01 to 3.0% by weight of the total weight of the fish meat and the bleaching water.

Inside the tank 15, the fish meat is bleached for 1 to 2 minutes, while being gently stirred by the stirrer 16. The rotating speed of the stirrer 16 may be in the range of 30 to 60 rpm (rotations per minute), for example. Then, the content of the tank 15 is supplied through line L6 into a second bleaching tank 17 by means of a screw pump P2 known per se. The pump P2 is a heavy duty pump whose rotating speed is in the range of 1,500 to 2,200 rpm, and the fish meat is forcibly and strongly stirred when passing through the pump P2. As a result, the tissues in the meat are fully pulverized.

In the tank 17, the mixture of fish meat and water containing the quality-improving agent is gently stirred once again for several minutes by means of a stirrer 18, which is similar to the stirrer 16. Thereafter, the mixture is supplied through line L7 into a third bleaching tank 19 by means of a screw pump P3, which is similar to the pump P2. In the third tank 19, the fish meat is bleached for several minutes, while being gently stirred by means of a stirrer 20 similar to stirrer 16. Next, the mixture is supplied through line L8 into a fourth beaching tank 21 by means of a screw pump P4 similar to pump P2. In the fourth tank 21, the fish meat is bleached, while being gently stirred by means of stirrer 22 similar to stirrer 16.

When a predetermined amount of fish meat has been collected in tank 21, the fish meat is supplied through line L9 into a preliminary dewatering device 23 by means of rotary-type metering pump P5, and in the preliminary dewatering device 23, the fish meat is dewatered. The dewatered fish meat is collected in a tank 25. From the tank 25, the fish meat is supplied through line L11 by means of a rotary-type pump P6, to the step of removing fine bones, hard muscles and skins from the fish meat.

When the fish meat treated with water inside the tank 15 is supplied to the next bleaching tank, and the tank 15 becomes empty, fish meat is newly supplied into the empty tank 15. Inside the tank 15, fresh water and a quality-improving agent are added to the newly-supplied fish meat, and the fish meat is treated with water, in a similar manner to that mentioned above. In this way, the bleaching treatment with water can be successively performed. In the case where the fish to be processed is not fresh or does not contain tough meat, just like the fish dwelling in a shallow fishing ground or the fish after spawning, the fish meat has to be prevented from excessively expanding and should not be excessively treated with water. In this case, valve V3 and/or valve V4 are operated, so as to supply the bleached fish meat from the tank 15 to either tank 19 or tank 21 by way of line L12 arranged above tanks 17, 19 and 21.

After being cleared of fine bones, hard muscles and skins, the fish meat is added with additives such as sorbitol, sugar and polyphosphoric acid, and the mixture is ground to produce a surimi product. The surimi can be encased and rapidly frozen for a long-term storage.

To obtain a fish meat paste from the surimi, the surimi is fully mixed with seasonings, such as table salt, sugar, "mirin" (a sweet seasoning sake), and sodium glutamate, together with secondary raw materials, such as starch, and the white of an egg. The mixture is shaped into a predetermined form by stuffing it into casings, or attached to a plate, and is then subjected to heat treatment, such as cooking in steam, cooking in hot water, roasting, or frying. By this heat treatment step, the surimi is deprived of consistency and becomes a gel. As a result, an elastic, jelly-like fish paste product is obtained. If, prior to the heat treatment, the surimi in the casings is left to stand at a low temperature (in the range of about 5° to about 10° C.) for about 18 to about 24 hours, or at a relatively high temperature (in the range of 30° to 35° C.) for 35 to 45 minutes, it is possible to make a paste product of higher quality. These preliminary treating steps are called "suwari" treatments. The former "suwari" is referred to as a low temperature suwari treatment, and the latter as a high temperature suwari treatment.

According to the present invention, even if fish meat of poor quality is processed, the quality of the surimi or fish paste product obtained therefrom is as high as the quality of a first-class product. To be more specific, the surimi product obtained by the method of the present invention may have a gel value in the range of 1,300 to 2,000 or more, even when fish meat of poor quality is used, which provides a surimi having a gel value of at most 1,000 by the conventional method. The "gel value" is a mathematical product of "jelly strength (W) (g)" and "limit-depression value (L) (cm)". The fish paste product will be broken if it is depressed more than the limit-depression value. The above-noted advantage of the invention is considered attributable to the synergistic effect of the addition of the quality-improving agent and the forcible stirring of fish meat during bleaching.

The present invention will be explained below by way of Examples, but the present invention should not be limited thereto.

EXAMPLES 1-3

These Examples were for proving the advantageous effect of the quality-improving agent used in the present invention.

Fish meat was taken out of a walleye pollack in an ordinary method, and water and the quality improving agent shown in Table 1 below were added thereto, in the proportion of 1,000 parts by weight of fish meat 2,000 parts by weight of water and 0.25% of quality-improving agent based on the total weight of the fish meat and the water. In this state, the fish meat was bleached. Thereafter, the resultant fish meat was preliminarily dewatered, then cleared of fine bones, hard muscles and skins, then dried again, and then ground.

The ground fish meat was subjected to salting for 15 minutes, with 0.3% by weight of table salt added thereto. The surimi, thus obtained, was stuffed into casings each of which was made by a polyethylene tube having a lay flat width of 40 mm. In this state, the surimi was immersed in hot water of 90° C. for 40 minutes, and then cooled in cold water, thus producing "kamabokos"(i.e., boiled fish paste).

After being left to stand overnight at 5° C., each "kamaboko" was tested at room temperature by means of a food checker (Rheo-Tex Model: SD-305 (plunger tip diameter: 5 mm), made by Sun Science Co., Ltd., Japan). The jelly strength (W-Val) and the limit-depression value (L-Val) of each "kamaboko" measured with the food checker are shown in Table 1, along with their mathematical product (i.e., a gel value).

TABLE 1

| | Quality-Improving Agent | W-Val (g) | L-Val (cm) | GEL (W × L-Val) |
|---|---|---|---|---|
| Comparison 1 | Not Used | 651 | 1.17 | 762 |
| Comparison 2 | NaCl | 980 | 1.19 | 1166 |
| Example 1 | CaCl$_2$ | 1052 | 1.58 | 1662 |
| Example 2 | CaCl$_2$ + NaCl (50:50) | 1955 | 1.60 | 3128 |
| Example 3 | KCl | 987 | 1.60 | 1579 |

EXAMPLES 4-6

These Examples were similar to Example 1, except that calcium chloride was used as the quality-improving agent in the proportions indicated in Table 2 below. "Kamabokos" were produced in the same manner as in Example 1, and were measured in quality. The results of the measurement are shown in Table 2.

TABLE 2

| | *CaCl$_2$ (% by Weight) | W-Val (g) | L-Val (cm) | GEL (W × L-Val) |
|---|---|---|---|---|
| Comparison 3 | 0.025 | 720 | 1.15 | 828 |
| Example 4 | 0.03 | 899 | 1.38 | 1240 |
| Example 5 | 0.15 | 928 | 1.52 | 1411 |
| Example 6 | 0.3 | 1297 | 1.36 | 1764 |

TABLE 2-continued

| | *CaCl$_2$ (% by Weight) | W-Val (g) | L-Val (cm) | GEL (W × L-Val) |
|---|---|---|---|---|
| Comparison 4 | 0.35 | 910 | 1.28 | 1165 |

*the amounts of CaCl added to 1,000 parts by weight of fish meat and 2,000 parts by weight of water

EXAMPLES 7-9

In these Examples, a surimi product was produced from a walleye pollack after spawning, by use of the apparatus shown in FIG. 1.

Fish meat was taken out of the walleye pollack in an ordinary method and supplied into the washing/dewatering machine 11, then into tank 12, and then into the first bleaching tank 15. Inside the first bleaching tank 15, 150 parts by weight of fresh water were added to 100 parts by weight of fish meat and the quality-improving agent were added in an amount indicated below based on the total weight of the fish meat and the water. The fish meat was bleached for 1 minute in tank 15, for 2 minutes in tank 17, for 2 minutes in tank 19, and for 1 minute in tank 21. The rotating speed of the screw pumps P2-P4 was 2,000 rpm. The content volume of each bleaching tank was 800 liters. The time required for the fish meat to be fed from one bleaching tank to the next bleaching tank was 0.5 minutes.

The fish meat thus bleached was dewatered preliminarily, cleared of fine bones, hard muscles and skins, dewatered again, and then ground. The ground fish meat, surimi, was subjected to salting for 15 minutes, with 0.3% by weight of table salt added thereto. Then, the surimi was stuffed into casings each of which was made by a polyethylene tube having a lay flat width of 40 mm. Thereafter, the fish meat in some of the casings was immersed in warm water of 30° to 35° C. for 35 to 45 minutes (high temperature suwari), while the fish meat in the other casings was not. Then, the fish meat in all casings was cooked in hot water of 90° C. for 45 to 60 minutes, and was then cooled, thus making fish paste products. Ten products of each sample were tested in a similar manner to that of Example 1. The results are shown below. It should be noted that no quality-improving agent was added to the fish meat in Control 1. In the descriptions below, "NO-SUWARI COOK" indicates that fish meat was subjected to the heat treatment without being subjected to the suwari treatment, and "SUWARI COOK" indicates that fish meat was subjected to the heat treatment after being subjected to the suwari treatment

EXAMPLE 10

Example 10 is similar to Example 5, except that the walleye pollack processed in Example 10 was caught on a different day from the walleye pollack processed in Example 5. Data on Example 10 is shown below. It should be noted that no quality-improving agent was not used in Control 2.

| | Control 1 | | | | Example 7 (CaCl$_2$ 0.02% NaCl 0.02%) | | |
|---|---|---|---|---|---|---|---|
| | NO-SUWARI COOK | | | | NO-SUWARI COOK | | |
| | W-VAL (g) | L-VAL (cm) | GEL W × L | | W-VAL (g) | L-VAL (cm) | GEL (W × L) |
| 1 | 709 | 1.16 | 822 | 1 | 946 | 1.14 | 1078 |
| 2 | 619 | 1.17 | 724 | 2 | 987 | 1.17 | 1155 |
| 3 | 669 | 1.14 | 763 | 3 | 1214 | 1.11 | 1348 |
| 4 | 654 | 1.09 | 713 | 4 | 857 | 1.23 | 1076 |
| 5 | 674 | 1.14 | 768 | 5 | 1101 | 1.08 | 1189 |
| 6 | 582 | 1.09 | 634 | 6 | 899 | 1.13 | 1016 |
| 7 | 764 | 1.18 | 902 | 7 | 952 | 1.16 | 1104 |
| 8 | 602 | 1.18 | 710 | 8 | 1102 | 1.19 | 1311 |
| 9 | 717 | 1.27 | 911 | 9 | 983 | 1.17 | 1150 |
| 10 | 590 | 1.12 | 661 | 10 | 869 | 1.18 | 1014 |
| AVE. | 658 | 1.15 | 761 | AVE. | 990 | 1.16 | 1148 |
| | SUWARI COOK | | | | SUWARI COOK | | |
| | W-VAL (g) | L-VAL (cm) | GEL (W × L) | | W-VAL (g) | L-VAL (cm) | GEL (W × L) |
| 1 | 604 | 1.16 | 701 | 1 | 1246 | 1.18 | 1470 |
| 2 | 798 | 1.10 | 878 | 2 | 1166 | 1.19 | 1388 |
| 3 | 709 | 1.12 | 794 | 3 | 1287 | 1.24 | 1596 |
| 4 | 620 | 1.22 | 756 | 4 | 1343 | 1.30 | 1746 |
| 5 | 744 | 1.19 | 885 | 5 | 1328 | 1.28 | 1700 |
| 6 | 684 | 1.12 | 766 | 6 | 1183 | 1.14 | 1349 |
| 7 | 628 | 1.14 | 716 | 7 | 1664 | 1.38 | 2296 |
| 8 | 776 | 1.17 | 908 | 8 | 1274 | 1.21 | 1542 |
| 9 | 725 | 1.13 | 819 | 9 | 1350 | 1.25 | 1688 |
| 10 | 683 | 1.14 | 779 | 10 | 1498 | 1.28 | 1917 |
| AVE. | 697 | 1.15 | 802 | AVE. | 1334 | 1.25 | 1668 |
| | Example 8 (CaCl$_2$ 0.025% NaCl 0.025%) | | | | Example 9 (CaCl$_2$ 0.03% NaCl 0.03%) | | |
| | NO-SUWARI COOK | | | | NO-SUWARI COOK | | |
| | W-VAL (g) | L-VAL (cm) | GEL (W × L) | | W-VAL (g) | L-VAL (cm) | GEL (W × L) |
| 1 | 1043 | 1.18 | 1231 | 1 | 972 | 1.28 | 1244 |
| 2 | 1003 | 1.17 | 1174 | 2 | 1083 | 1.45 | 1570 |
| 3 | 1086 | 1.23 | 1336 | 3 | 1065 | 1.33 | 1416 |

-continued

| | | | | | | | |
|---|---|---|---|---|---|---|---|
| 4 | 1133 | 1.22 | 1382 | 4 | 1067 | 1.42 | 1515 |
| 5 | 922 | 1.15 | 1060 | 5 | 1265 | 1.46 | 1847 |
| 6 | 1122 | 1.27 | 1425 | 6 | 1149 | 1.39 | 1597 |
| 7 | 1172 | 1.24 | 1453 | 7 | 1182 | 1.40 | 1655 |
| 8 | 1021 | 1.18 | 1205 | 8 | 1129 | 1.39 | 1569 |
| 9 | 1190 | 1.21 | 1440 | 9 | 1084 | 1.36 | 1474 |
| 10 | 914 | 1.14 | 1042 | 10 | 1058 | 1.29 | 1365 |
| AVE. | 1061 | 1.20 | 1273 | AVE. | 1105 | 1.38 | 1524 |

| | SUWARI COOK | | | | SUWARI COOK | | |
|---|---|---|---|---|---|---|---|
| | W-VAL (g) | L-VAL (cm) | GEL (W × L) | | W-VAL (g) | L-VAL (cm) | GEL (W × L) |
| 1 | 1386 | 1.35 | 1871 | 1 | 1768 | 1.52 | 2687 |
| 2 | 1040 | 1.76 | 1830 | 2 | 1620 | 1.62 | 2624 |
| 3 | 1700 | 1.43 | 2431 | 3 | 1853 | 1.51 | 2798 |
| 4 | 1726 | 1.54 | 2658 | 4 | 1945 | 1.77 | 3443 |
| 5 | 1635 | 1.64 | 2681 | 5 | 1932 | 1.57 | 3033 |
| 6 | 1368 | 1.39 | 1902 | 6 | 1971 | 1.68 | 3311 |
| 7 | 1613 | 1.39 | 2242 | 7 | 1641 | 1.52 | 2494 |
| 8 | 1795 | 1.55 | 2782 | 8 | 1972 | 1.68 | 3313 |
| 9 | 1781 | 1.47 | 2618 | 9 | 1650 | 1.56 | 2574 |
| 10 | 1283 | 1.74 | 2232 | 10 | 1936 | 1.66 | 3214 |
| AVE. | 1533 | 1.53 | 2346 | AVE. | 1829 | 1.61 | 2945 |

| | Control 2 | | | | Example 10 (CaCl$_2$ 0.025% NaCl 0.025%) | | |
|---|---|---|---|---|---|---|---|
| | NO-SUWARI COOK | | | | NO-SUWARI COOK | | |
| | W-VAL (g) | L-VAL (cm) | GEL (W × L) | | W-VAL (g) | L-VAL (cm) | GEL (W × L) |
| 1 | 777 | 1.34 | 1041 | 1 | 1044 | 1.29 | 1347 |
| 2 | 737 | 1.42 | 1047 | 2 | 1013 | 1.20 | 1216 |
| 3 | 887 | 1.28 | 1135 | 3 | 1023 | 1.21 | 1238 |
| 4 | 822 | 1.21 | 995 | 4 | 1087 | 1.22 | 1326 |
| 5 | 892 | 1.41 | 1258 | 5 | 1018 | 1.19 | 1211 |
| 6 | 726 | 1.35 | 980 | 6 | 1121 | 1.29 | 1446 |
| 7 | 945 | 1.31 | 1238 | 7 | 1134 | 1.24 | 1406 |
| 8 | 848 | 1.32 | 1119 | 8 | 1210 | 1.27 | 1537 |
| 9 | 792 | 1.27 | 1006 | 9 | 979 | 1.18 | 1155 |
| 10 | 796 | 1.33 | 1059 | 10 | 1241 | 1.33 | 1651 |
| AVE. | 822 | 1.32 | 1085 | AVE. | 1087 | 1.24 | 1348 |

| | SUWARI COOK | | | | SUWARI COOK | | |
|---|---|---|---|---|---|---|---|
| | W-VAL (g) | L-VAL (cm) | GEL (W × L) | | W-VAL (g) | L-VAL (cm) | GEL (W × L) |
| 1 | 1075 | 1.36 | 1462 | 1 | 1387 | 1.31 | 1817 |
| 2 | 891 | 1.27 | 1132 | 2 | 1040 | 1.80 | 1872 |
| 3 | 860 | 1.39 | 1195 | 3 | 1634 | 1.64 | 2680 |
| 4 | 893 | 1.26 | 1132 | 4 | 1651 | 1.87 | 3087 |
| 5 | 1101 | 1.34 | 1475 | 5 | 1312 | 1.36 | 1784 |
| 6 | 912 | 1.27 | 1158 | 6 | 1700 | 1.43 | 2431 |
| 7 | 1580 | 1.36 | 2149 | 7 | 1781 | 1.47 | 2618 |
| 8 | 896 | 1.30 | 1165 | 8 | 1777 | 1.61 | 2861 |
| 9 | 1021 | 1.36 | 1389 | 9 | 1542 | 1.46 | 2251 |
| 10 | 1005 | 1.35 | 1357 | 10 | 1424 | 1.71 | 2435 |
| AVE. | 1024 | 1.33 | 1362 | AVE. | 1525 | 1.57 | 2394 |

What is claimed is:

1. A method for producing a ground fish meat (surimi) comprising the steps of:
   bleaching raw fish meat with water in the presence of a quality-improving agent comprising calcium chloride, potassium chloride, or a mixture of sodium chloride with potassium chloride or calcium chloride in an amount of 0.01 to 3.0% of the total weight of the raw fish meat and the bleaching water, and, during the bleaching, forcibly stirring the fish meat by means of a screw pump at a rotation speed of 1,500 to 3,000 rpm such that tissues of the fish meat are fully pulverized; and
   making surimi products from the raw fish meat thus bleached.

2. The method according to claim 1, wherein said sodium chloride accounts for 30 to 80% by weight in the mixture.

3. The method according to claim 1, further comprising the steps of dewatering the bleached raw fish meat; stuffing the dewatered raw fish meat into a casing; and rapidly freezing the fish meat.

4. A method for producing a fish paste product comprising the steps of:
   encasing the surimi product obtained in claim 1; and
   subjecting the surimi product to a heating treatment to gel the surimi.

5. The method according to claim 4, further comprising the step of subjecting the encased surimi to a suwari treatment, prior to the heat treatment.

6. The method according to claim 5, wherein the suwari treatment is carried out at a low temperature of about 5° to about 10° C. for about 18 to about 24 hours.

7. The method according to claim 5, wherein the suwari treatment is carried out at a higher temperature of 30° to 35° C. for 35 to 45 minutes.

8. A method for producing a ground fish meat product (surimi) comprising the steps of:
providing a water-bleaching device comprising washing tank means including at least first and second tanks, each tank being provided with a stirrer;
subjecting raw fish meat to a bleaching treatment, which comprises;
washing, in said first tank, raw fish meat with fresh water in the presence of a quality-improving agent selected from the group consisting of calcium chloride, potassium chloride and a mixture of sodium chloride with potassium chloride or calcium chloride dissolved therein in an amount of 0.01 to 3.0% by weight based on the total weight of the raw fish meat and the bleaching water, under a gentle stirring condition of the stirrer at a rotation speed of 30 to 60 rpm,
transferring the content of said first tank to said second tank while forcibly stirring said content by means of a screw pump at a rotation speed of 1,500 to 2,200 rpm so that tissues in the fish meat are fully pulverized, and
subjecting, in said second tank, the thus transferred content of said first tank, containing the pulverized fish meat and the water together with the quality-improving agent, to a gentle stirring condition of the stirrer at a rotation speed of 30 to 60 rpm; and
making surimi products from the raw fish meat thus bleached.

9. The method according to claim 8, wherein said quality-improving agent is a mixture of sodium chloride and calcium chloride.

10. The method according to claim 8, wherein said making of surimi comprises dewatering the bleached raw fish meat, stuffing the dewatered raw fish meat into a casing, and rapidly freezing the fish meat.

11. The method according to claim 8, wherein said bleaching device has a third tank, and the method further comprises, after the subjecting step, the steps of:
transferring the content of said second tank to the third tank while forcibly stirring said content of said second tank by means of a screw pump at a rotation speed of 1,500 to 2,200 rpm so that tissues in the fish meat are fully pulverized, and subjecting, in the third tank, the thus transferred content of said second tank, containing the pulverized fish meat and the water together with the quality-improved agent, to a gentle stirring condition of the stirrer at a rotation speed of 30 to 60 rpm.

* * * * *

UNITED STATES PATENT AND TRADEMARK OFFICE
CERTIFICATE OF CORRECTION

PATENT NO.   :   5,229,151
DATED        :   July 20, 1993
INVENTOR(S)  :   Michihiko Yano et al It is certified that error appears in the above-identified patent and that said Letters Patent is hereby corrected as shown below:

In column 6, line 46, please delete "869" and substitute therefor --859--.

In column 7, line 62, please delete "3,000" and substitute therefor --2,200--.

Signed and Sealed this

Eighth Day of March, 1994

Attest:

BRUCE LEHMAN

Attesting Officer    Commissioner of Patents and Trademarks